2 Sheets—Sheet 1.
J. H. WHITNEY.
HARVESTER.
No. 170,140. Patented Nov. 16, 1875.
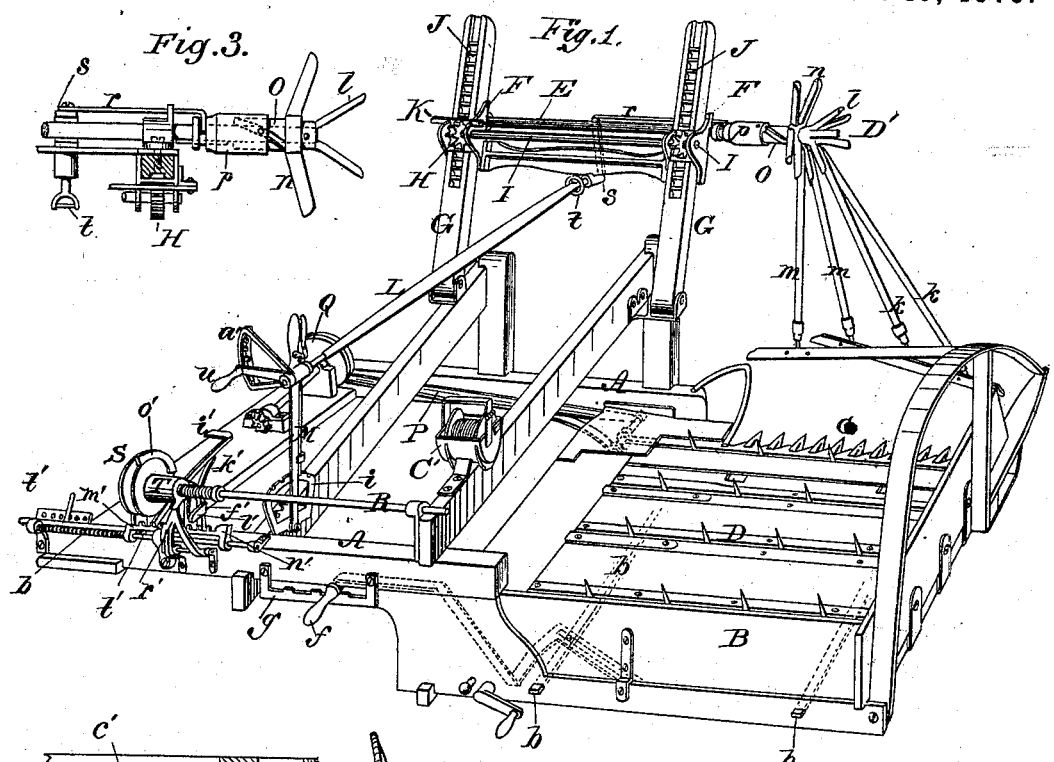
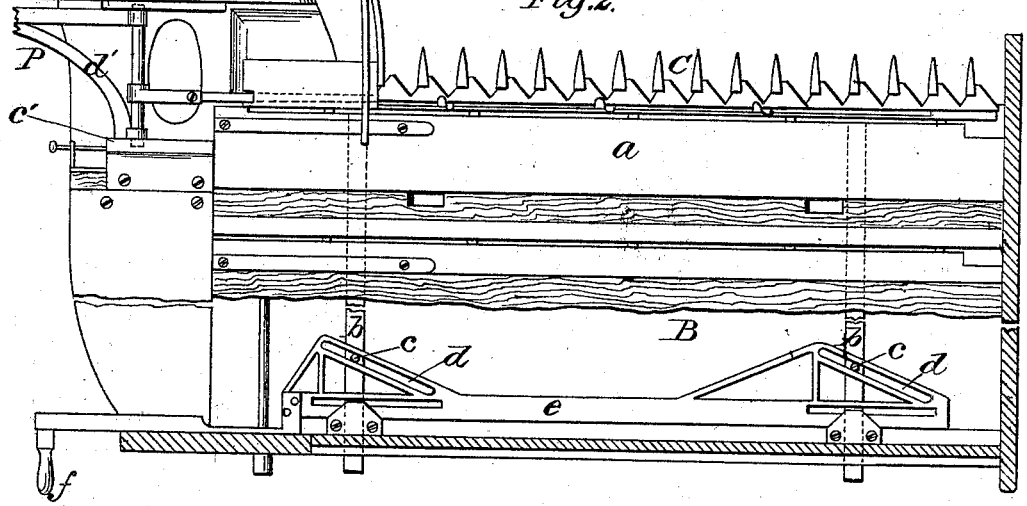
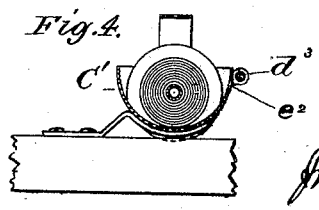
Witnesses:
Will W. Dodge
Donn Twitchell
Inventor:
Jno. H. Whitney
By Dodge & Son
Attys
N. PETERS, PHOTO-LITHOGRAPHER, WASHINGTON, D. C.

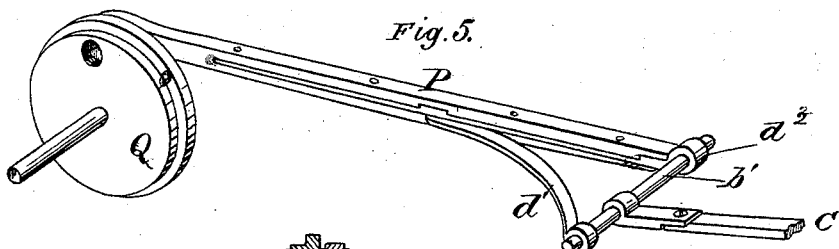
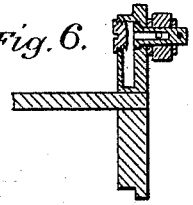
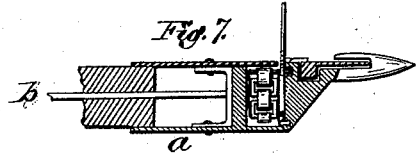
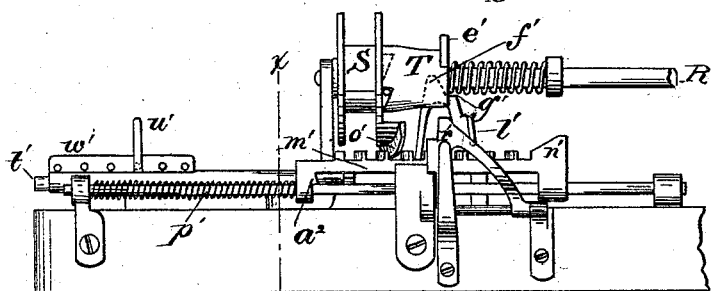
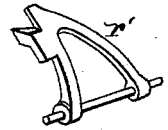
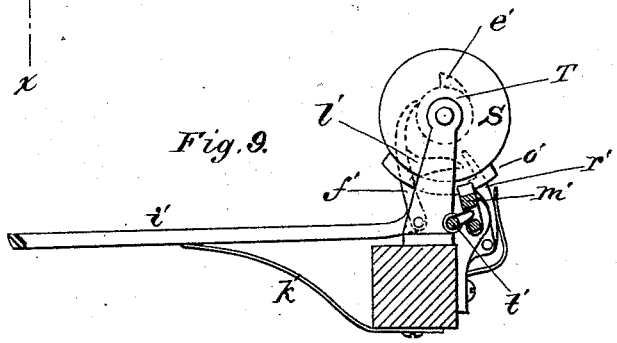

UNITED STATES PATENT OFFICE.

JOHN H. WHITNEY, OF ST. LOUIS, MISSOURI, ASSIGNOR TO THE SUMNER & WHITNEY MANUFACTURING COMPANY, OF SAME PLACE.

IMPROVEMENT IN HARVESTERS.

Specification forming part of Letters Patent No. 170,140, dated November 16, 1875; application filed June 7, 1875.

*To all whom it may concern:*

Be it known that I, JOHN H. WHITNEY, of St. Louis, in the county of St. Louis and State of Missouri, have invented certain Improvements in Grain Harvesting and Binding Machines, of which the following is a specification:

My invention consists in so arranging the cutting devices that they can be adjusted forward and backward in the machine, in order to deliver the grain in such position that, whether long or short, it will receive the binding-band at the middle; in a peculiar construction and arrangement of the pitman which operates the adjustable cutter-bar; in a novel manner of mounting the reel, so that it can be moved forward and backward, and also adjusted vertically; in a novel manner of constructing the reel, so that its beaters or blades may be set at an angle or inclination to the cutter, for the purpose of delivering inclined grain squarely upon the platform; in a combination of devices for changing the length of time between the formation of bundles; and in a device for producing the required tension on the binding-wire.

Figure 1 represents a perspective view of a machine having my improvements embodied therein; Fig. 2, a top-plan view of the platform, with portions broken away, showing the manner of adjusting the cutting mechanism, and the construction and arrangement of the pitman; Fig. 3, a plan view, showing the manner in which the reel is constructed to admit of its beaters or blades being adjusted; Fig. 4, a vertical cross-section of the wire-spool and the friction-case in which it is mounted; Fig. 5, a perspective view of the crank-wheel and pitman by which the cutter is driven; Fig. 6, a cross-section of the crank-wheel, showing the arrangement for lubricating the wrist on which the pitman works; Fig. 7, a vertical cross-section of the adjustable cutting mechanism; Fig. 8, a rear elevation of the mechanism which controls the operation of the binding devices; Fig. 9, a cross-section of the same on the line *x x*; Fig. 10, a view of one of the parts detached.

In its general construction and mode of operation the present machine resembles those for which I have recently made application for Letters Patent, the machine consisting, essentially, of a main frame, A, on which will be mounted the driving-gear and binding mechanism, and of a rectangular flat platform, B, attached to the side of the frame, and carrying the cutting mechanism C and endless-chain rakes D, or their equivalents, for delivering the grain squarely over the inner end of the platform to the binding mechanism.

In order that grain of different lengths may be delivered to the binding mechanism in such position as to receive the binding-band around its middle, without making the binder adjustable for that purpose, as usual, I arrange the cutting devices in such manner that they may be moved forward and backward in relation to the binding mechanism, so that the cut grain, whether long or short, may be delivered on the machine with its middle in line with the wire-carrying devices.

When cutting long grain, the cutter is set forward, so that the butts of the grain will fall well forward in the machine, and as the grain becomes shorter, the cutter is drawn back to correspond, the adjustment being always made so that the grain will fall in such position as to be carried up to the binder in such manner as to receive the wire or other binding-band at the middle.

In building the machine, I prefer to employ the adjustable cutter in connection with a stationary platform, as represented in the drawings; but the same result may be attained by moving the entire platform, with the knife mounted thereon, forward and backward in relation to the binding mechanism and the main frame.

In the drawing the platform is secured rigidly to the main frame, and the finger-bar and knife made adjustable forward and backward on the front edge of the platform, as represented in Figs. 1, 2, and 7.

As shown in Fig. 7, the finger-bar is secured to a wide shoe, *a*, which is recessed to receive the front edge of the platform, the shoe being arranged to slide freely forward and backward thereon far enough to compensate for the variations in the length of the grain. The shoe is provided at its ends with two bars, *b*, which extend backward in or under the platform to its rear side, where they are provided with pins or studs $c$, which enter two parallel slots, $d$, formed in the ends of a transverse sliding bar, $e$, as shown in Fig. 2, so that by moving the said bar $e$ endwise, the shoe and cutting devices may be advanced and retracted, and at the same time kept parallel with the edge of the platform. The bar $e$ is provided with an operating arm or handle, $f$, and is locked fast by a notched bar, $g$, on the main frame, with which the handle engages, as shown in Fig. 1.

It is obvious that in place of the slotted bar $e$, any other suitable device may be employed for moving the shoe $a$, and that, instead of employing the shoe, the finger-bar may be sustained in any other manner which will admit of its being adjusted.

In order to permit the forward and backward movement of the cutter without affecting the operation of the driving mechanism, the pitman P, which transmits motion from the crank-wheel Q to the reciprocating knife, has its ends forked and provided, as shown in Figs. 2 and 5, with a long wrist or journal, $b'$, on which the end of the knife is free to slide. The ends of the wrist or journal are extended outside of the pitman, and arranged to slide in slotted guides $c'$, secured to the platform and frame, as shown, so that the usual destructive up-and-down strain on the knife-head is prevented, and the parts caused to work easily and smoothly.

I prefer to construct the pitman, as shown in Fig. 5, of wood, with one of the bearings $d^2$ for the journal or wrist attached directly to the end of the wooden body, and the other attached to the end of a metal arm, $d^1$. The arm $d^1$, and also an arm formed on the bearing $d^2$, are extended up within the wooden body of the pitman and secured by rivets passing through the same, as shown, for the purpose of giving it strength and stiffness. The pitman thus constructed is cheaper, lighter, and easier to drive than those of metal, and also operates with less noise and clatter.

The grain falling on the platform is carried to the binding mechanism by endless chains D, which are mounted lengthwise in the platform, and provided with upright carrying-teeth, similar in operation to those now in use on other machines.

When using the endless chains and the movable cutter, it is advisable to mount the forward chain in the movable shoe, or in some other suitable manner so that it will move forward with the cutter, and always take hold of the grain close to the butt-end.

In order to permit the forward and backward movement of the chain, the pulleys which carry it are arranged to slide on their shafts, the latter being provided with splines to keep the pulleys from turning thereon.

The machine is provided with an overhanging reel, D', which has its shaft E mounted in two sliding shoes, F, which are mounted on two standards, G, which latter are pivoted to the main frame at their lower ends, as shown in Fig. 1. By sliding the shoes on the standards, the reel may be raised and lowered, as required, and by swinging the standards on their pivots it may be thrown forward and backward to any required position. The shoes F are formed on opposite ends of the same bar, and are moved up and down on the standards by means of two pinions, H, which are mounted in the respective shoes, on opposite ends of a shaft, I, and arranged to engage in rack-bars J on the standards, as shown in Fig. 1, so that upon turning the shaft, which is done by means of a crank or wrench, both shoes are moved to the same extent, and the reel-shaft retained in its horizontal position. The reel is locked in position on the standards by means of a latch, K, pivoted to one of the shoes, and engaging in its pinion, as shown in Figs. 1 and 3. The standards are thrown forward and backward on their pivots, and held in position by a bar or shaft, L, which has its front end jointed to the bar which carries the shoes F, and its rear end pivoted to a hand-lever, M, which is mounted in an upright position on the main frame, and provided with a locking-dog, engaging in a segmental rack, $i$, as shown in Fig. 1.

In order that grain which inclines to the right or left may be delivered squarely upon the platform, so as to pass in proper shape to the binder, I construct the reel in such manner that its blades or beaters may be instantly set obliquely, or at an angle to the front of the platform, either toward the right or the left, as may be required.

The peculiarity of the construction is clearly shown in Figs. 1 and 3, the blades or beaters being supported at their outer ends by arms $k$, which are secured rigidly to a head, $l$, fastened firmly on the shaft, and supported at their inner ends by arms $m$, secured to a head, $n$, which is free to rotate, to a limited extent, upon the shaft. By turning the head $n$ on the shaft the relative position of the arms $k$ and $m$ may be changed so as to set the beaters or blades in line with the front of the platform, or at an angle thereto in either direction.

The turning of the head $n$ is accomplished by providing it with a spirally-grooved hub, $o$, fitting within a sliding sleeve, $p$, which latter is provided with a pin entering the spiral groove, and prevented from turning on the shaft by a spline, so that as the sleeve is moved endwise its pin, sliding in the spiral groove, causes the hub to rotate. The sleeve $p$ is provided at one end with a peripheral groove, to receive the forked end or clutch of a bar, $r$, which has its opposite end pivoted to a crank-arm, $s$, which is secured in the cross-bar connecting the shoes, and connected, by a universal joint, $t$, to the end of the bar or shaft L, which holds the reel-standards, as shown in Fig. 1. The rear end of the bar L is journaled in a block pivoted on the side of the hand-lever M, and is provided with a crank, $u$, by means of which the bar may be turned, and the crank $s$ and bar $r$ caused to slide the sleeve $p$, and thereby shift the rake-blades. The crank $u$ is provided with a spring-catch, which engages in a segmental rack, $a^1$, on the side of the hand-lever, as shown in Fig. 1, so as to lock the parts, and hold the rake-blades in position.

It will be seen that with the parts combined in the manner shown the movement of the crank $u$ will set the blades of the reel in line with the cutter, or give them more or less inclination to the right or the left, as may be required. The essential feature is, the arrangement of the arms supporting the blades in such manner that their relative positions may be changed; and it is obvious that the precise construction and arrangement of the parts and their operating mechanism is a matter of minor importance.

As the grain in the field varies greatly in the thickness or closeness, being sparse at one point and thick at another, it is desirable to have the automatic binding mechanism arranged in such manner that it will act at longer or shorter intervals, according to the thickness of the grain and the consequent distance the machine has to travel in cutting sufficient grain to form a bundle. I therefore mount on the machine a combination of devices which may be instantly adjusted to throw the binder into action after any given intervals, and which also admit of its being started, when required, at any instant.

In Figs. 1, 8, and 9, R represents the shaft through which the binder is operated, and S a driving-pulley mounted loosely on one end of the shaft, and provided on one side with ratchet-teeth to engage with and drive a clutch, T, which is mounted on the shaft in such manner that it can slide but not turn thereon. The pulley S receives a continuous motion, but turns the shaft and operates the binder only when the clutch T engages therewith, the binder standing at rest whenever the clutch is thrown back out of action. The clutch is thrown back and held by means of an arm, $e^1$, formed on its side, and a dog, $f'$, pivoted to the frame in front of the hub, and in the path of the arm $e^1$ as the latter revolves with the clutch. The upper end of the dog $f'$ is inclined or beveled on one side, and at the lower end of the bevel is provided with a square shoulder, $g'$, so that when the dog is thrown inward against the rotating hub, the arm $e^1$, coming in contact with the inclined end of the dog, is thrown back and brought to a stop upon the shoulder $g'$, thereby throwing the clutch and shaft out of gear and holding them still. When the dog $f'$ is thrown back from under the arm $e^1$ the clutch is released and engages with the driving-pulley again, so as to set the binder-shaft in motion. The dog is provided with an arm, $i'$, which is forced upward by a spring, $k'$, to hold the end of the dog against the clutch, as shown in Fig. 9. The dog is also provided on its rear side with an arm, $l'$, and on the frame there is mounted a sliding rack-bar, $m'$, having at one end an incline, $n'$, which rides under the arm $l'$ of the dog, for the purpose of throwing the dog back and allowing the clutch to engage with the driving-pulley, as before explained. The rack-bar is drawn forward, to bring its incline against the arm $l'$ of the dog $f'$, by means of a spiral rib, $o'$, formed on the periphery of the driving-pulley S, as shown in Figs. 1, 8, and 9, the rib advancing the bar one tooth at the revolution of the pulley. The rack-bar is urged constantly backward by a spiral spring, $p'$, and is held, as it is drawn forward by the spiral rib, by a dog, $r'$, pivoted to the frame, and pressed against the rack by a spring. When the machine is in operation the arm $e^1$, resting against the dog $f'$, holds the clutch out of gear and the binding devices at rest until, by successive turns of the pulley, its rib $o'$ has drawn the rack-bar forward sufficiently to bring its incline $n'$ under the arm $l'$ of the dog $f'$, and thereby throw the dog from under the arm of the clutch T, whereupon the clutch engages with the pulley and the binder is set in motion.

As the clutch revolves, its arm $e^1$ throws the dog $r'$ out of the rack-bar, which is carried back by the spring to its original position. As the binder-shaft completes its revolution, the arm of the clutch again comes in contact with the dog $f'$, and, throwing the parts out of action, holds them until, by the revolutions of the pulley, the rack-bar is again drawn forward to trip the dog.

As the frequency with which the binder-shaft is operated depends upon the number of turns made by the pulley in drawing the rack-bar forward, I bring the shaft into action at longer or shorter intervals, by simply limiting the backward movement of the rack-bar, so that it will require to be drawn forward a greater or less distance in order to bring its incline against the dog. This is accomplished by a sliding and turning rod, $t'$, having at one end a lip for the rack-bar to strike against, and at the other end a handle, $u'$, provided with a locking-stud to enter holes in a stationary bar, $w'$, as shown in Figs. 1, 8, and 9. By moving the rod endwise to the proper point, and locking the stud on its handle into one of the holes, the backward movement of the rack-bar may be checked at such point that one, two, or any other desired number of turns of the pulley will cause it to trip the dog.

The shock of the rack-bar as it slides back is prevented from unlocking the rod $t'$ by providing the rack-bar with an incline, $a^2$, which acts against the lip of the rod in such manner as to hold the rod from turning, as in Fig. 8.

From the above description, it will be seen that the movement of the handle $u'$ controls perfectly the length of time elapsing between the operations of the binding mechanism, enabling the operator to control perfectly the size of the bundles, notwithstanding the variations in the thickness or closeness with which the grain may stand in the field.

When, for any reason, it is desirable to start the binder before the regular time, the arm $i'$ is depressed, and the dog $f'$ thereby thrown back. When this is done the rack-bar will be permitted to slide back, as usual, and the regular time will elapse before the binding of the next bundle, unless the arm is again brought into requisition.

In order to produce the proper tension on the binding-wire, I wind it upon a spool having heads or flanges, and mount said spool in a semicircular cup or case, $c'$, having slits in its ends, through which the flanges drop, so that the body of wire bears on the bottom of the cup. In the front of the cup or case there is a horizontal slit, $e^2$, and in front of, and parallel with, the slit a roller, $d^3$. A stirrup or bail hinged to one side of the cup, and secured to the other by a hook and staple, passes over the spool to retain it in place. When a heavy tension is required, the wire is drawn from the top of the spool, through the slit, and under the roller; and when a light tension is required, the wire is drawn from the under side of the spool, through the slit, and over the roller.

Having described my invention, what I claim is—

1. The movable shoe $a$, mounted on the front edge of the platform, and provided with the finger-bar, as shown.

2. In combination with the adjustable cutting mechanism, the rods or bars $b$ and the obliquely-slotted sliding bar $e$.

3. In combination with the cutter-bar or knife, movable forward and backward, as described, the pitman P, provided with an elongated wrist or journal, $b'$, substantially as shown.

4. In combination with the cutter-bar or knife, movable forward and backward, as described, the pitman, provided with the long wrist $b'$, and guided at its lower end in bearings on the frame, as shown.

5. In combination with the movable shoe or its equivalent, carrying the cutting devices, the rake-chain or conveyer, mounted therein so as to move forward and with the cutter, for the purpose described.

6. The combination of the two pivoted reel-standards G, provided with the racks J, the sliding shoes F, mounted on the standards, and the pinions H, mounted in the shoes, and connected by the shaft I, as shown, whereby the reel-shaft is maintained in a horizontal position, and adjusted at both ends at once.

7. In combination with the shaft E, provided with the fixed head $l$ and its rigid arms $k$, and the rotary head $n$, provided with the arms $m$, the blades or beaters, having their ends attached to said arms, as shown.

8. In combination with the shaft E, the rotating spirally-grooved head $n$ and the sliding sleeve $p$, provided with a pin entering the groove, and held from turning on the shaft by a spline or its equivalent.

9. In combination with the sliding sleeve $p$, arranged as and for the purpose described, the bar $r$, crank $s$, and rock-shaft L, provided with handle $u$.

10. In combination with the sliding shoe F, provided with the pinion H, the pivoted latch K, arranged to engage with the pinion, as shown.

11. The device for controlling the operation of the binder-shaft, consisting of the loose pulley S, provided with the oblique rib $o'$, the clutch T, provided with the arm or lip $e^1$, the dog $f'$, provided with the inclined end, shoulder $g'$, and arm $b'$, the sliding rack-bar $m'$, provided with the incline $n'$, the dog $r'$, the spring $p'$, for moving the rack-bar backward, and the adjustable stop for limiting the backward movement of the rack, substantially as shown.

12. A binder-operating mechanism, consisting essentially of a shaft, R, provided with a clutch, T, a loose driving-pulley, S, provided with a spiral rib, $o'$, and a sliding rack-bar, $m'$, operated by the rib $o'$, and arranged to throw the clutch in gear at regular intervals, substantially as shown and described.

13. In combination with the sliding rack-bar $n'$, arranged and operating as described, an adjustable stop for limiting its backward movement, substantially as shown and described.

14. In combination with the rack-bar $m'$, arranged and operating as described, the sliding and rotating rod $t'$, provided with the handle $u'$ and the plate $w'$, for locking the same in place.

15. The tension device consisting of the cup or case $C'$, provided with the vertical slits through its bottom, the horizontal slit $e^2$ and roller $d^2$ at its front, and the flanged roll in its interior, as shown and described.

JOHN H. WHITNEY.

Witnesses:
 THEO. G. FITCH,
 F. E. WASHBURN.